July 28, 1942.   F. W. SLACK   2,291,112
PIVOTED JOINT
Original Filed March 17, 1938
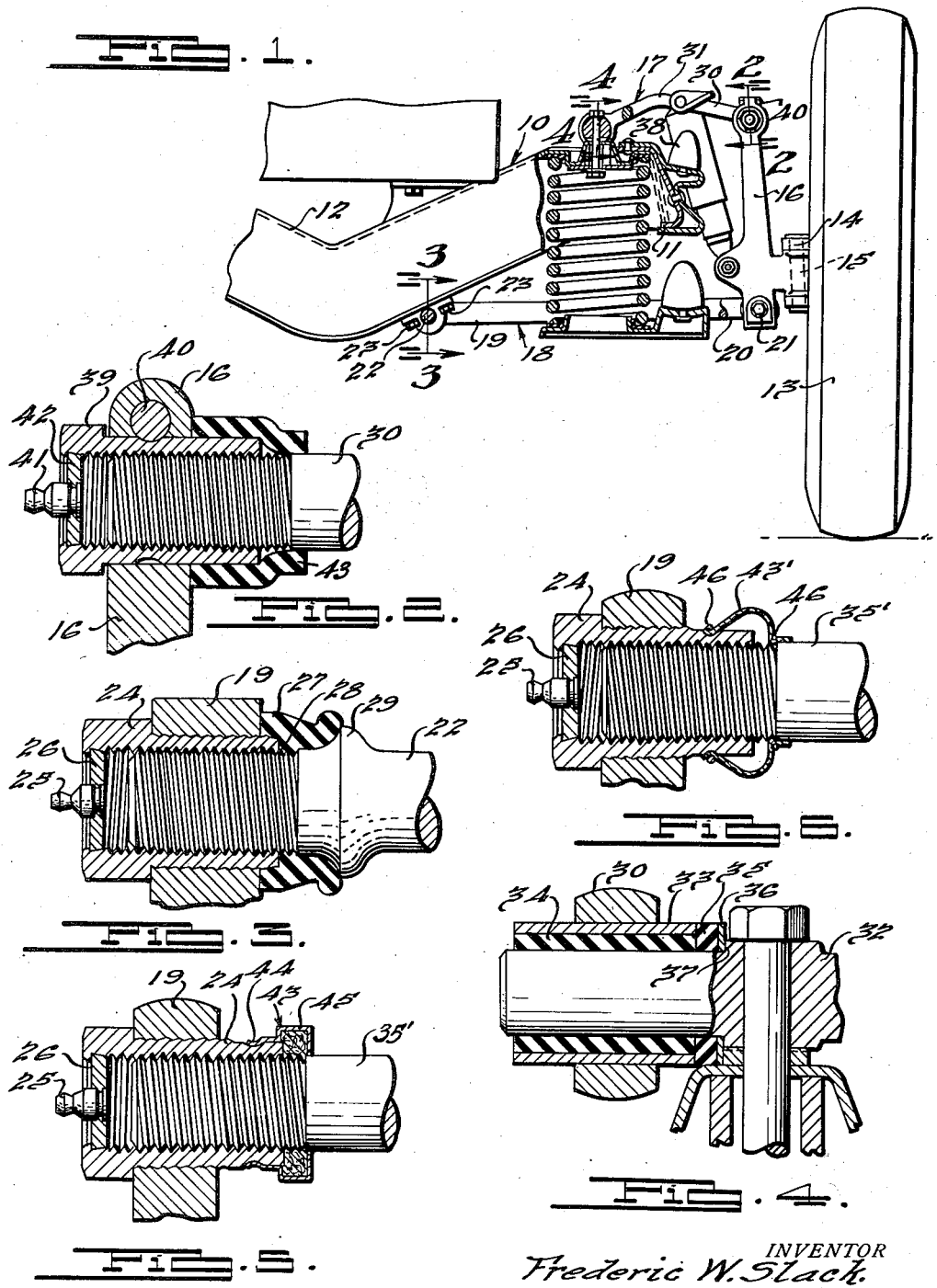
INVENTOR
Frederic W. Slack.
BY
Harness, Lund, Pate & Harris
ATTORNEYS.

Patented July 28, 1942

2,291,112

UNITED STATES PATENT OFFICE 2,291,112

PIVOTED JOINT

Frederic W. Slack, Detroit, Mich., assignor to Chrysler Corporation, Highland Park, Mich., a corporation of Delaware Original application March 17, 1938, Serial No. 196,349, now Patent No. 2,198,680, dated April 30, 1940. Divided and this application November 8, 1939, Serial No. 303,442

1 Claim. (Cl. 287—93)

This invention relates to motor vehicles and is a division of my copending application Serial No. 196,349, filed March 17, 1938, now Patent No. 2,198,680, dated April 30, 1940.

An object of the invention is the provision of means for sealing the articulated connections between relatively movable parts, and more particularly to provide means of this character which is especially adapted to seal the articulated connections between relatively movable parts of a wheel suspension system.

Another object of the invention is the provision of sealing means of the foregoing type which is relatively inexpensive and which will effectively prevent escapement of lubricant from the connection and also exclude foreign matter therefrom; and to provide sealing means which is preferably yieldable and which will not deteriorate in the presence of lubricants or greases.

Other objects and advantages of the invention will be more apparent from the following description taken in connection with the accompanying drawing, wherein:

Fig. 1 is a front elevational view of a typical side portion of the front end of a vehicle embodying the invention.

Fig. 2 is an enlarged sectional view taken on the line 2—2 of Fig. 1.

Fig. 3 is an enlarged sectional view taken on the line 3—3 of Fig. 1.

Fig. 4 is an enlarged sectional view taken on the line 4—4 of Fig. 1.

Figs. 5 and 6 are enlarged sectional views similar to Fig. 3, but illustrating modified forms of the seal shown therein.

The invention is illustrated and described in connection with a motor vehicle chassis including a frame structure generally indicated at 10 having longitudinally extending transversely spaced channel-shaped side rails, one of which is shown at 11. The rails are connected adjacent the forward end of the frame by a cross bracing 12.

A front steerable road wheel 13 is independently suspended for relative rising and falling movements with respect to the frame structure 10 and with respect to the remaining road wheels of the vehicle by supporting and guiding mechanism comprising a steering knuckle 14 having a spindle (not shown) on which the wheel 13 is journalled. The steering knuckle 14 is pivotally connected by a king pin 15 with the generally vertically extending knuckle bracket support arm 16. The latter is articulated or pivoted at its upper and lower end portions respectively with the upper and lower laterally extending linkages 17 and 18 of the suspension.

The lower linkage 18 is of the wishbone type and includes a pair of arms 19 and 20 having their outer ends pivotally connected as at 21 with the lower end portion of the knuckle support 16. The inner ends of the arms 19 and 20 are connected to the cross bracing 12 by a shaft 22 secured to the latter by bolts 23. A connection between the shaft 22 and arm 19 is more particularly shown in Fig. 3, it being understood that the connection between the other arm 20 and shaft 22 is the same.

The shaft 22 has a threaded end portion extending into an eye of the arm 19 and is connected to the latter by a bushing 24 having its outer surface in threaded engagement with the wall of the eye and its inner surface in threaded engagement with the shaft, thus accommodating relative movement between the linkage 18 and shaft 22 in response to vertical displacement of the wheel 13. Lubricant is admitted to the engaging threaded surfaces of the shaft and bushing through a suitable fitting 25 carried by a closure 26 for the outer end of the bushing.

For the purpose of confining the lubricant to the threaded connection and also for preventing foreign matter gaining access thereto, there is provided a seal 27, preferably formed of rubber, or a material such as "Neoprene," formerly called "Duprene" and chemically known as polymerized chloroprene, having rubber-like characteristics and superior oil and heat resisting properties. The seal 27 overlaps the adjacent end portion of the bushing 24 and the adjacent non-threaded portion of the shaft 22, thus bridging that portion of the threaded surface of the shaft 22 which is normally free from engagement with the bushing 24. The seal 27 is in the form of an annular sleeve and is sufficiently yieldable so that when assembled it securely engages the parts to prevent escapement of lubricant and exclude foreign matter from the connection, an inner annular rib-like portion 28 engaging that portion of the threaded surface of shaft 22 which is normally free from engagement by the bushing 24. Preferably the seal is positioned axially between and abuts the adjacent side face of the arm 19 and a shoulder 29 formed on the shaft 22.

The upper linkage 17 includes a pair of arms 30 and 31 having their inner ends pivotally supported from the frame by a shaft 32 carried by the latter as more particularly pointed out in the aforesaid parent application. While the connection between the arm 30 and shaft 32 is particularly shown in Fig. 4, it will be understood that the connection between the other arm 31 and the shaft 32 is the same. The arm 30 has an eye receiving an end portion of the shaft 32 and which is connected thereto by a bushing assembly including a metallic sleeve 33 having a press-fit within the eye and an inner sleeve 34 of resilient material, preferably rubber. The sleeve 34 is preferably under compression between the sleeve 33 and the shaft 32 and relative movement between the latter and the linkage 17 is accommodated by deformation of the sleeve 34. An annular washer 35 of resilient material, such as rubber, is disposed between the inner end of the sleeves 33, 34 and a metallic washer 36 bearing against a shoulder 37 of the shaft 32. The washer sleeve 35 seals the end portion of the bushing preventing foreign matter from gaining access to the interior surfaces thereof, and spaces and insulates the metallic sleeve 33 from the shaft 32.

The arm 31 of the upper linkage terminates in a flattened end portion engageable with a jounce bumper 38 while the arm 30 extends outwardly therebeyond and is formed to terminate in an end portion extending generally longitudinally of the frame structure and forwardly thereof for cantilever-like connection with the knuckle bracket support 16, as more particularly shown in Fig. 2. The upper end of the support 16 terminates in a slit portion having an opening therein in which is received the threaded end portion of the arm 30. An eccentric bushing 39, disposed in the opening, has threaded engagement with the arm 30, provides for camber adjustment of the wheel 13, and is maintained in fixed position of adjustment by a suitable pin 40. Lubricant is admitted to the threaded surfaces of the bushing and arm through a fitting 41 carried by a closure 42 in the outer enlarged end of the bushing 39.

For the purpose of confining the lubricant to the aforesaid connection and also for preventing foreign matter gaining access thereto, a seal formed of a material or materials similar to that set forth in connection with the seal 27 is provided. The seal 43 is in the form of a sleeve which axially overlaps the adjacent end portion of the bushing 39 and the adjacent non-threaded portion of the arm 30 thus bridging that portion of the threaded surface of the arm 30 which is normally free from engagement with the bushing 39. The seal is preferably so formed as to be sufficiently yieldable so that when assembled it securely engages the parts to seal the connection and thus remains axially fixed although in the form shown herein it is further fixed against axial displacement between the side face of the support 16 against which it abuts and the bowed portion of the arm 30.

In Figs. 5 and 6 there are illustrated modified forms of the seal which may be substituted for the forms shown in Figs. 2 and 3. In Fig. 5 the seal includes an annular metallic housing 43 having a reduced portion 44 resiliently gripping the bushing 24 and an enlarged portion 45 extending axially of the shaft 35' bridging that portion of the threaded surface of the shaft which is normally free from engagement by the bushing 24. The portion 45 has a central opening accommodating the shaft 35' and has disposed therein a quantity of felt or similar material which cooperates with the housing to prevent escapement of lubricant from the connection as well as to prevent entry of foreign matter thereto.

In the embodiment of the invention shown in Fig. 6, the seal includes the metallic housing 43' which resiliently grips the shaft 35' and the bushing 24 and is further maintained in position by wires 46 encircling the housing.

Although but several embodiments of the invention are herein shown and described, it will be understood that various changes in the size, shape and arrangement of parts may be made without departing from the spirit of my invention and it is not my intention to limit said invention other than by the terms of the appended claim.

I claim:

In a joint for a vehicle road wheel suspension, the combination of a pair of relatively movable members, one of said members having a threaded part disposed in angular relationship with respect to and adapted to be operatively connected with the other of said members, a bushing operatively connecting said members and in rotatable threaded engagement with said one member for accommodating relative movement of said members, a portion of said threaded part being spaced from said bushing and normally exposed, and a sleeve-like resilient sealing element resiliently gripping said bushing and said one member and bridging said normally exposed threaded portion, said element being torsionally stressed in response to relative movement of said members.

FREDERIC W. SLACK.